（12）United States Patent
Wu et al.

(10) Patent No.: US 8,639,643 B2
(45) Date of Patent: Jan. 28, 2014

(54) CLASSIFICATION OF A DOCUMENT ACCORDING TO A WEIGHTED SEARCH TREE CREATED BY GENETIC ALGORITHMS

(75) Inventors: Ren Wu, San Jose, CA (US);
Sheng-Wen Yang, Beijing (CN);
Yuhong Xiong, Mountain View, CA (US); Li Zhang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 13/119,936

(22) PCT Filed: Oct. 31, 2008

(86) PCT No.: PCT/CN2008/072888
§ 371 (c)(1),
(2), (4) Date: Mar. 18, 2011

(87) PCT Pub. No.: WO2010/048758
PCT Pub. Date: May 6, 2010

(65) Prior Publication Data
US 2011/0173145 A1    Jul. 14, 2011

(51) Int. Cl.
*G06F 15/18*  (2006.01)
*G06N 3/00*   (2006.01)
*G06N 3/12*   (2006.01)

(52) U.S. Cl.
USPC ............................................................ 706/13

(58) Field of Classification Search
USPC ............................................................ 706/13
See application file for complete search history.

(56) References Cited

U.S. PATENT DOCUMENTS

| | | | |
|---|---|---|---|
| 2002/0078044 A1* | 6/2002 | Song et al. | 707/6 |
| 2006/0288275 A1* | 12/2006 | Chidlovskii et al. | 715/513 |
| 2007/0251998 A1* | 11/2007 | Belenki | 235/380 |
| 2008/0005094 A1 | 1/2008 | Cunnane et al. | |
| 2009/0216696 A1* | 8/2009 | Downs et al. | 706/20 |

OTHER PUBLICATIONS

Meijuan, "An Application of a Genetic Algorithm in a Web Document Feature Acquirement Algorithrn", Jrnl of Weifang Univ., Jul. 2008, V.8(4), pp. 54-56.

* cited by examiner

*Primary Examiner* — Kakali Chaki
*Assistant Examiner* — Ababacar Seck (57) ABSTRACT

A device for classifying a document comprises a module to generate a data tree structure and configured to assign terms to a first plurality of nodes of the data tree structure, where each of the first plurality of nodes is assigned a weight. In assigning the weights of the first plurality of nodes, a first generation of combinations of possible weights assignable as the weights of the first plurality of nodes is obtained, and a second generation of combinations of possible weights assignable as the weights of the first plurality of nodes is obtained by performing the genetic algorithms in the first generation of combinations of possible weights. The device determines whether the document is in a document class based at least the weights of the first plurality of nodes.

18 Claims, 4 Drawing Sheets

CLASSIFICATION OF A DOCUMENT ACCORDING TO A WEIGHTED SEARCH TREE CREATED BY GENETIC ALGORITHMS

CROSS-REFERENCES

This application is related to copending and commonly assigned Non-Provisional U.S. patent application Ser. No. 11/831,841, entitled "Using a Weighted Tree to Determine Document Relevance" and filed on Jul. 31, 2007, the disclosure of which is hereby incorporated by reference in its entirety.

BACKGROUND

Classification of documents with respect to a document class is a common task in data processing, with broad application in business intelligence, web-searching, etc. For instance, classification of documents may be performed to find documents in the Internet in response to a search query placed through a search engine. One conventional way of classifying documents has been through use of a simple Boolean logic, where documents are determined to be in a class of documents or not according to the Boolean logic. However, use of Boolean logic often requires a relatively complicated command in retrieving desired documents and often does not have a desired specificity in searching logics.

Other examples of conventional ways of classifying documents are use of: a naive Bayes' classifier, which is a simple probabilistic classifier based on applying Bayes' theorem with strong-independence assumptions; a decision tree, which is a decision support tool that uses a graph or model of decisions and their possible consequences, including chance event outcomes, resource costs, and utility; and support vector machines (SVMs), which are a set of related supervised learning methods used for classification and regression.

However, while the above-described conventional ways of classifying documents have sometimes proven to be successful, there is still a need for a classification method that is simpler than and achieves comparable results to conventional classification methods.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

As disclosed herein, classification of documents, according to an example, may be performed by using a weighted search tree designed for a document class, where the weighted search tree comprises leaf nodes and common nodes. Leaf nodes may each be assigned a term and a location where the term is to appear in order to be relevant for the classification analysis involving the respective leaf node. The common nodes are each assigned an operator and a weight. By using the weighted search tree disclosed herein, classification of documents may be made as a function of occurrences of the terms of the leaf nodes in specified locations of the respective leaf nodes, the operators of the common nodes, and the weights of the common nodes and the leaf nodes. For instance, a determination whether a document is in the document class may be made by determining a relevance score of the document as a function of occurrences of the terms of the leaf nodes in specified locations of the respective leaf nodes, the operators of the common nodes, and the weights of the common nodes and the leaf nodes, and comparing the relevance score of the document with a relevance score threshold set for the document class.

As further disclosed herein, in constructing the weighted search tree for a document class, the weights of the leaf nodes and common nodes may be optimized by using genetic algorithms of an inheritance, a crossover, and a mutation in a pool of combinations of possible weights assignable as the weights of the leaf nodes and the common nodes to evolve the pool into better-fitted combinations of possible weights assignable as the weights of the leaf nodes for the document class. Fitness evaluations of combinations of possible weights in each generation are performed to assist the genetic algorithms and determine which of the combinations of possible weights in the lastly obtained generation of combinations of possible assignable weights is selected as the weights of the leaf nodes and common nodes.

Figure 1:
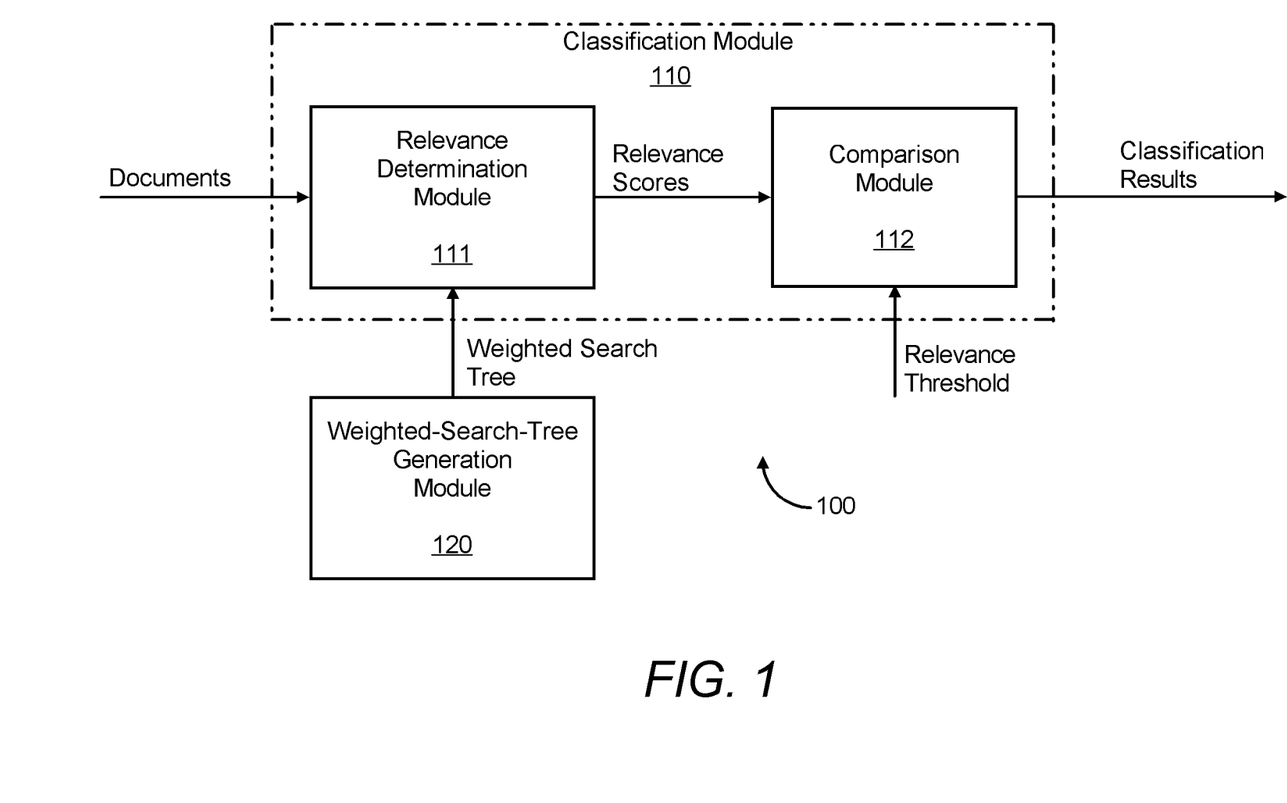
FIG. 1 illustrates a classifier device comprising a weighted-search-tree generation module and a classification module according to an exemplary embodiment of the invention.

Turning now to FIG. 1, shown therein is the classifier device 100 comprising a classification module 110 and a weighted-search-tree generation module 120 according to an example. It should be understood that the classifier device 100 may include additional components and that some of the components described herein may be removed and/or modified without departing from a scope of the classifier device 100.

In describing the components of the classifier device 100 more specifically, the classification module 110 is coupled to the weighted-search-tree generation module 120 and uses a weighted search tree constructed by the weighted-search-tree generation module 120 in determining whether a document is in a document class. The classification module 110 comprises a relevance determination module 111 and a comparison module 112. The relevance determination module 111 receives documents from any reasonably suitable source such as a modem device connected to the Internet for retrieving documents from the Internet, a bus in a computer connected to a computer readable storage device for retrieving documents from the storage device, a buffer connected to a computer readable storage device for temporarily buffering documents from the storage device, etc. After receiving documents, the relevance determination module 111 determines a relevance score of each document with respect to a document class according to the weighted search tree constructed by the weighted-search-tree generation module 120 for the document class.

The comparison module 112 receives the relevance scores from the relevance determination module 111 to be compared with respect to a relevance score threshold set for a document to be in the document class. Based on the comparison, the comparison module 112 may decide that documents having relevance scores equal to or higher than the threshold to be in the document class. After the documents have been classified, the comparison module 112 outputs the classification results of the classifier device 100, where the classification results may comprise an identification of documents in the document class and an identification of documents not in the document class. The classification results outputted from the classification module 110 may be communicated to any reasonably suitable output device (not shown) such as a display for displaying a list of documents in the document class, a printer for printing the list of documents, a computer readable storage device for storing the list of documents, etc.

The comparison module 112 may be a single-stage classification module or a multiple-stage classification module, where each stage may have a different classification criteria so that each subsequent stage further refine the classification results from the previous stage. For instance, in a two-stage classification module, the first stage may be designed with a high-recall performance, and the second stage may be designed with a high-precision performance, where the recall and precision metrics for determining the effectiveness of a classification are discussed more specifically below.

For a relevance score threshold set for the comparison module 112 or for each stage of the comparison module 112, the threshold may be a fixed value or may be adjustable in order to allow, for example, a selection of a certain number of documents with a relevance score higher than the threshold as documents in the document class.

The weighted-search-tree generation module 120 generates the weighted search tree used by the classification module 110 in performing classification of documents, where the weighted search tree may be constructed in accordance with genetic algorithms as described below and any and all features of the weighted search tree may be performed by the weighted-search-tree generation module 120.

As referred to in this disclosure, a module such as the relevance determination module 111, the comparison module 112, and the weighted-search-tree generation module 120 may be any reasonably suitable module for performing the functions of the module such as software stored on one or more tangible computer readable storage mediums, which performs functions of the module when executed by one or more control processors with a circuitry to execute the software, a combination of such software and such control processors, one or more application-specific integrated circuits (ASICs) for performing functions of the module, any combination of the foregoing components, etc.

Figure 2:
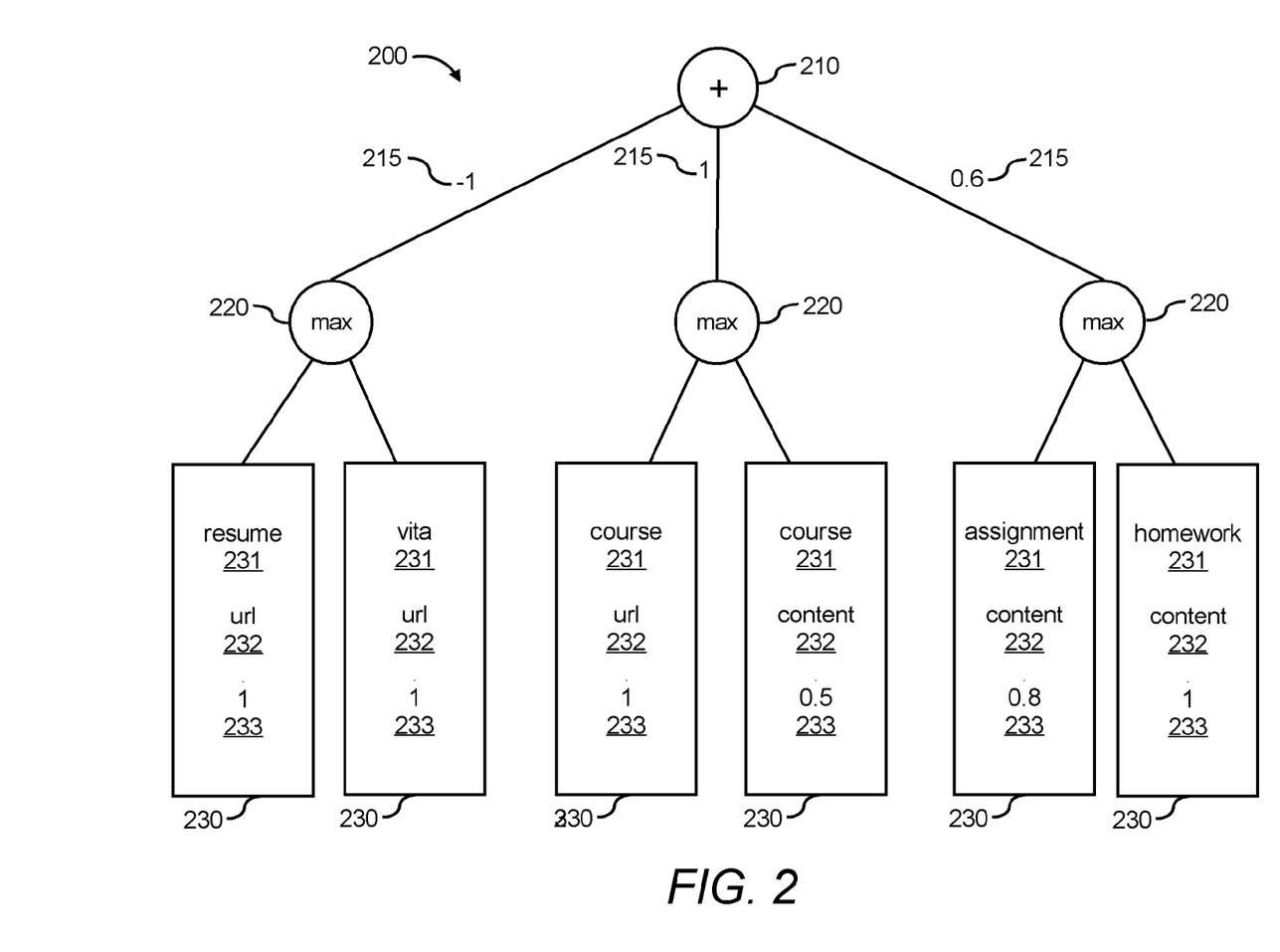
FIG. 2 illustrates an example of a weighted search tree for a document class, which may be used by a relevance determination module of a classification module for determining relevance scores of documents according to an exemplary embodiment of the invention.

Now turning to FIG. 2, shown therein is a weighted search tree 200 for a document class according to an example, which is constructed by the weighted-search-tree generation module 120 and used by the relevance determination module 111 for determining relevance scores of documents with respect to a document class. In explaining the weighted search tree 200 briefly, the weighted search tree 200 is a data tree structure that specifies terms of interest and their associated locations for the leaf nodes, weights of the common nodes and leaf nodes, and operators of the common nodes, and is used to determine relevance scores for documents based upon whether the terms appear at the associated locations of the documents. The weights of the weighted search tree 200 may take into consideration the relevance score threshold set for a document to be in the document class such that after the weights of the weighted search tree 200 are assigned, if the relevance score threshold is adjusted, the weights of the weighted search tree 200 may also need to be adjusted correspondingly in order to keep the status quo for the classifier device 100 as a whole in classifying documents.

More specifically, the weighted search tree 200 has three levels of nodes, where a root node 210, common nodes 220, and leaf nodes 230 form top, middle and bottom levels of the weighted search tree 200, respectively. It should be understood that the weighted search tree 200 may include additional components and levels of nodes and that some of the components described herein may be removed and/or modified without departing from a scope of the weighted search tree 200.

Each leaf node 230 is assigned a term 231 and a location 232 where the term 231 is to appear in a document in order to be relevant to the classification analysis involving the respective leaf node. Each term 231 represents a word, words or any other reasonably suitable content such as phrases, symbols, etc., where the presence of the term at a specified location of the document contributes to a relevance score of the document. The location 232 specifies a location in a document where the presence of the term 231 in the location contributes to the relevance score of the document.

The location 232 may be any reasonably suitable location in a document such as the content, the title, the uniform resource locator (URL), the address, the header, the metadata, etc. Multiple locations 232 may be designated for a same term 231 of the leaf nodes 230 in the weighted search tree. For instance, in FIG. 2, the term "course" appears in two separate leaf nodes 230, once with the leaf node 230 with the location "URL" and once with the leaf node 230 with the location "content." Further, the locations 232 of any one or more leaf nodes 230 may be omitted if the terms 231 of the one or more leaf nodes 230 contributes to the relevance score of the document regardless of where in the document the terms appear.

A weight 233 is assigned to each leaf node 230, where each weight 233 indicates a level of relevance assigned to the term 231 of the respective leaf node 230 when the term 231 appears at the location 232. For instance, the greater the weight 233 of a leaf node 230, the leaf node 230 has a greater contribution in the calculation of relevance scores for documents having the respective term 231 at the specified location 232. More specifically, for instance, a weight of 10 assigned to a leaf node 230 may make the presence of the term assigned to the respective leaf node 230 at the specified location more significant than if a weight of 3 was assigned to the leaf node 230. For a leaf node 230, if the respective term 231 appears at the respective location 232, the leaf node 230 outputs the respective weight 233 as an output of the leaf node 230. Otherwise, the leaf node 230 outputs zero.

With respect to the common nodes 220, each common node 220 is assigned one or more leaf nodes 230 and an operator and receives outputs of the assigned leaf nodes 230 as inputs of the operator. The operator of each of the common nodes 220 designates a type of an operation to be performed on inputs of the operator and may be any reasonably suitable operator such as an addition operator, a maximum operator, a minimum operator, a multiplication operator, etc.

In explaining each type of operators more specifically, an addition operator adds operator inputs to produce the sum as an output of the operator. A maximum operator selects a maximum of operator inputs as an output of the operator. A minimum operator selects a minimum of operator inputs as an output of the operator. In addition to the foregoing operators, operators corresponding to other mathematical operations or formulas such as multiplications and integrations may also be used for each operator of the root node 210 and the common nodes 220.

With respect to the common nodes 220 in FIG. 2 according to an example, each common node 220 is assigned a maximum operator, which selects a maximum of operator inputs as an output of the operator. Alternatively, any one or more of the operators of the common nodes 220 may be changed to other operators such as a maximum operator, a minimum operator, a multiplication operator, etc., for different document classes and classification needs.

Outputs from the common nodes 220 are received by the root node 210, which is the highest common node of the weighted search tree 200, as inputs of an operator assigned to the root node 210. However, before being applied as inputs of the operator of the root node 210, the outputs of the common nodes 220 are multiplied by respective weights 215 assigned to the common nodes 220. For instance, considering the left-most branch of the weighted search tree 200 stemming from the root node 210, if the output of the common node 220 is 1 and the weight 215 is −1, the multiplied product of the two values, −1, is applied as an input to the root node 210.

The root node 210 is assigned an addition operator according to an example, which adds operator inputs and provides the sum as an output of the operator and thus as an output of the root node 210. Alternatively, the operator of the root node 210 may be changed to any other operator such as a maximum operator, a minimum operator, a multiplication operator, etc. for different document classes and classification needs. The output of the root node 210 obtained as described above is a relevance score for a document with respect to a document class as determined by using the weighted search tree 200 designed for the document class. Contributions from all branches of the weighted search tree 200 stemming from the root node 210 determine the relevance score of the document.

The weighted search tree 200 may be specifically designed to classify documents with respect to a document class of academic classes at universities, as shown in FIG. 2 according to an example. For instance, if a plurality of documents to be classified are web pages, the weighted search tree 200 is used to determine web pages in the document class of academic classes at universities in response to a determination of relevance scores of the web pages with respect to the document class.

In determining a relevance score of a web page with respect to the document class of academic classes at universities, contributions to the relevance score from the two left-most leaf nodes 230 of the weighted search tree 200 may be first determined. The two left-most leaf nodes 230 of the weighted search tree 200 are respectively assigned the terms "resume" and "vita," where the terms are roughly equivalent in meaning and thus are assigned the same weight of 1 if either term appears at the specified location 232, URL. Since weights of the two left-most leaf nodes 230 of the weighted search tree 200 are both 1 and the operator of the left-most common node 220 in the weighted search tree 200 is a maximum operator, it follows that if either or both of the terms "resume" or "vita" is found in the URL of the web page, the output of the left-most common node 220 of the weighted search tree 200 equals 1. The value of 1 indicates that the left branch of the weighted search tree 200 stemming from the root node 210 will contribute to the relevance score of the web page. However, if neither term is found in the URL of the web page, the output of the left-most common node 220 of the weighted search tree 200 equals zero, which value indicates that the web page will not contribute to the relevance score of the web page.

The output of the left-most common node 220 of the weighted search tree 200 is multiplied by the respective weight 215, here "−1," and the product of the multiplication is supplied as an input of the root node 210. The multiplication factor of "−1" takes into consideration that the appearance of either of the terms "resume" and "vita" in the URL indicates that the web page is less likely to belong to the document class of academic classes at universities, whereas the absence of the same terms does not affect the likelihood one way or the other. In other words, the negative multiplication factor of −1 assumes that the presence of the term "resume" or the term "vita" in the URL indicates that the web page is in fact a resume and not a university class page.

The weighted search tree 200 is further defined based on an assumption that both a resume and a class page may contain the term "resume" or the term "vita" in the content itself, but web pages in the document class of academic classes at universities are not likely to have the term "resume" or the term "vita" in their URLs.

The two center leaf nodes 230 of the weighted search tree 200 correspond to the existence of the term "course" in the URL and the content of a web page respectively. In the two center leaf nodes 230 of the weighted search tree 200, the weight of the term "course" is 1 when appearing in the URL, which is twice the weight of the term when appearing in the content, 0.5. A positive multiplication factor 1 represented by the weight 215 of the center common node 220 of the weighted search tree 200 takes into consideration that the presence of the term "course" in either the URL or the content is an indication that the web page is in the document class of academic classes at universities.

The two right-most nodes 230 of the weighted search tree 200 respectively correspond to the existence of the term "homework" and the term "assignment" in the content of a web page. In the two center leaf nodes 230 of the weighted search tree 200, the term "homework" is assigned the weight of 1, which is slightly higher than the weight of 0.8 assigned to the term "assignment." Such proportion of the weights takes into consideration that the term "assignment" may also occur in web pages in non-academic settings such as work assignments. The value of 0.6 assigned to the weight 215 of the right common node 220 of the weighted search tree 200 indicates that the presence of either of the terms "assignment" and "homework" in the content is indicative of the page being likely in the document class of academic classes at universities but less so than the term "course" in the two center leaf nodes 230 of the weighted search tree 200.

Now turning to an illustration of summing up, at the root node 210, contributions from each branch of the weighted search tree 200 stemming from the root node 210, if a web page is a course page and the URL of the course page is "www.caltech.edu/physics/course/qed" and the content contains both the words "homework" and "assignment" but none of the other terms 231 of the weighted search tree 200, the web page receives a relevance score of 1.6 as an output of the operator of the root node 210. The output is a sum of, with respect to the three branches of the weighted search tree stemming from the root node 210, an input of zero from or the left branch, 1 from the center branch, and 0.6 from the right branch. If a web page is a resume, the URL of the resume is "www.caltech.edu/~feynman/resume.html," and the content contains either or both of the terms "homework" and "assignment" but none of the other terms 231 of the weighted search tree, the web page receives a score of −0.4, which is the sum of, with respect to the three branches of the weighted search tree stemming from the root node 210, an input of −1 from the left branch, an input of zero from the center branch, and an input of 0.6 from the right branch.

Now turning to determining parameters and/or structures of the weighted search tree 200, genetic algorithms may be used to refine and improve any one or more or all of parameters and/or structures of the weighted search tree 200 such as weights 233 of the leaf nodes 230, weights 215 of the common nodes 220, and operators of common nodes 220 and the root node 210, and etc. However, for the purpose of illustration, applying genetic algorithms to refine and improve the weights 233 of the leaf nodes 230 of the weighted search tree 200 only will be discussed below.

Generally, genetic algorithms are a family of computational models inspired by an evolution. These algorithms encode a potential solution to a specific problem on simple chromosome-like data structures and apply recombination operators to these structures so as to preserve critical information.

An implementation of a genetic algorithm begins with obtaining or creating a first generation of, for instance, randomly or manually chosen chromosomes. Using the terminologies of genetic algorithms, the weight 233 of each leaf node 230 is a gene, and the six weights 233 of the leaf nodes 230 as a whole forms a chromosome. By randomly or manually choosing values of the weights of the leaf nodes 230 and thus combinations of weights of the leaf nodes 230, a first generation of chromosomes for the weighted search tree 200 for a further refinement of the combinations of weights of the leaf nodes 230 through genetic algorithms is accomplished.

After obtaining the first generation of chromosomes, genetic algorithms of an inheritance, a crossover, and/or a mutation may be performed on selected ones of the chromosomes. The selection of the chromosomes in the first generation of chromosomes to reproduce may be randomly made or by giving preference to better performing chromosomes. If the selection of chromosomes in the first generation of chromosomes is to give a preference to better performing chromosomes, a fitness evaluation of each of the chromosomes in the first generation is performed, and reproductive opportunities of the first generation of chromosomes are allocated in such a way that chromosomes with better fitness in performing a classification of documents for a document class are given more chances to reproduce than chromosomes with poorer fitness. Typically, fitness of a chromosome is defined with respect to the current generation.

In selecting chromosomes in the first generation allowed to reproduce, a fitness evaluation may be performed based upon any reasonably suitable criteria for determining fitness of a combination of weights of the leaf nodes 230 in classifying documents for a document class, such as precision, recall, a combination of precision and recall such as F1, means square error, etc.

In discussing different fitness evaluation criteria more specifically, precision is a metric for measuring a percentage of correctly identified documents in the total number of documents identified to be in a document class. Recall is a metric for measuring a percentage of identified ones of the total number of documents in the document class. F1 is a metric of classifier performance that combines both the precision and the recall. As to a means square error metric, if all of the documents in a document class are to have a certain fixed relevance score, a means square error with respect to the fixed relevance score may be determined for documents in the document class, and the determined means square error may be used for adjusting weights.

A selection of different criteria for a fitness evaluation of a combination of weights of the leaf nodes 230 often results in performance trade-offs. For instance, if precision is chosen as the fitness evaluation criteria, the resulting classifier may have a relatively high precision, but a relatively low recall. If recall is chosen as the fitness evaluation criteria, the resulting classifier may have a relatively high recall, but a relatively low precision. If F1 is chosen as a fitness function, the resulting classifier may have a balanced precision and recall performance.

Once the fitness evaluation criteria such as precision, recall, a combination of precision and recall such as F1, means square error, etc., is chosen, fitness of each combination of weights of the leaf nodes 230 may be evaluated from classification of training documents by using the respective combination of weights and evaluating the fitness of the combination based on the selected fitness criteria, where the training documents have been previously classified or are readily verifiable. Training documents with respect to a document class may be obtained by any reasonably suitable method of obtaining training documents, such as, manual classification of documents or automatic classification of documents and subsequent verification of the classification, etc.

With respect to the automatic classification of documents and subsequent verification of the classification for obtaining training documents, documents received by the classifier device 100 may be preliminary classified by the classifier device 100. The preliminary classification results outputted by the classifier device 100 may be verified manually as to the classification, and a verified set of classified documents may be produced as the training documents for the document class.

Once the fitness evaluation of each chromosome in the first generation is performed, chromosomes with better fitness results may be selected for reproducing. The selected chromosomes in the first generation may reproduce by performing one or more of genetic algorithms of an inheritance, a crossover, and a mutation.

In explaining each genetic operation more specifically, in an inheritance, some of the best chromosomes are carried over to the next generation without any change. In a crossover, one or more chromosomes in the next generation are obtained by crossing over genes in selected chromosomes of the previous generation. In a mutation, a gene of a selected chromosome is given some chance to make a random or an arbitrary change. Generally, in generating the second generation, a few best performing chromosomes in the first generation are kept without any change. Other chromosomes in the second generation are generated through crossovers and mutations.

After obtaining the second generation of combinations of weights of the leaf nodes 230, the above-discussed random-based or fitness-based selection of genes from the current generation and performing genetic algorithms of an inheritance, a crossover, and/or a mutation may be repeated a number of times to generate a subsequent generation of combinations of weights of the leaf nodes 230 and evolve the population of combinations of weights of the leaf nodes 230 into better-fitted combinations of weights of the leaf nodes 230 for performing a classification of documents with respect to the document class, for which the weighted search tree 200 is being designed.

In determining the number of times the above-discussed selection of chromosomes and obtaining a subsequent generation of chromosomes are repeated, the repetition may be fixed to a certain number so that a fixed number of generations are generated or number may be adjusted to meet a certain fitness threshold (for instance, a recall rate of 99%). After obtaining the last generation of combinations of chromosomes, the chromosome with the best fitness function performance may be selected to provide a combination of weights of the leaf nodes 230 for the weighted search tree 200.

Figure 3:
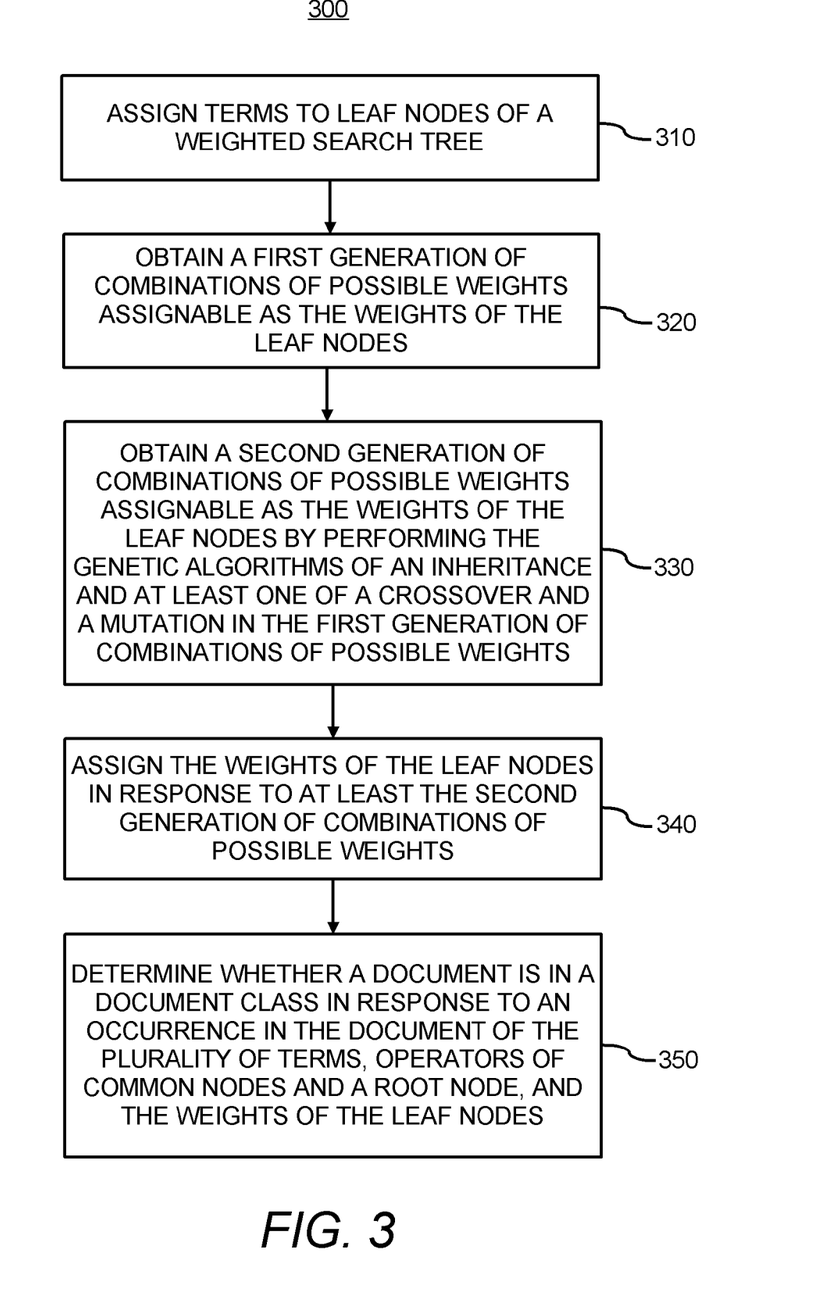
FIG. 3 illustrates a flowchart of a method for classifying a document in response to a weighted search tree and adjusting weights of the weighted search tree by using genetic algorithms according to an exemplary embodiment of the invention.

FIG. 3 illustrates a flowchart of a method 300 for classifying a document in response to a weighted search tree and adjusting weights of the weighted search tree by using genetic algorithms according to an example. It should be apparent to those of ordinary skill in the art that other steps may be added or existing steps may be removed, modified or rearranged without departing from a scope of the method 300.

At step 310, terms 231 are assigned, for example, by the weighted-search-tree generation module 120, to leaf nodes 230 of the weighted search tree 200. Each leaf node 230 is assigned a weight 233. In addition, the weighted search tree 200 comprises common nodes 220, and each common node 220 is connected to multiple leaf nodes 230 and is assigned an operator.

At step 320, a first generation of combinations of possible weights assignable as the weights 233 of the leaf nodes 230 is obtained, for example, by the weighted-search-tree generation module 120. The combinations of possible weights in the first generation correspond to chromosomes in genetic algorithms and the possible weights of each combination correspond to genes of the respective chromosome.

At step 330, a second generation (that is, the immediately next generation or a subsequent generation of the immediately next generation) of combinations of possible weights assignable as the weights 233 of the leaf nodes 230 is obtained by performing the genetic algorithms of an inheritance and at least one of a crossover and a mutation in the first generation of combinations of possible weights.

At step 340, the weights 233 of the leaf nodes 230 are assigned in response to at least the second generation of combinations of possible weights.

At step 350, a document is determined to be in a document class in response to an occurrence in the document of the plurality of terms, operators of the common nodes 220 and the root node 210, and the weights 233 of the leaf nodes 230.

In connection with the method 300, the inheritance may comprise inheriting selected ones of the combinations of possible weights in the first generation as selected ones of the combinations of possible weights in the second generation without any change. The crossover may comprise crossing over selected weights from at least two of the combinations of possible weights in the first generation and the mutation may comprise mutating selected weights of at least one of the combinations of possible weights in the first generation. Further, the operator of each common node 220 may perform one of selecting a maximum among inputs, selecting a minimum among inputs, and adding inputs, and each leaf node 230 may comprise a location of the respective term of the node. Still further, the common nodes 220 may be commonly connected to the root node 210, and the document may be determined to be in a document class by multiplying outputs of the common nodes 220 with the multiplication factors of the respective weights 215 and supplying the multiplied products as inputs to the root node 210.

After the generation of the second generation of combinations of possible weights assignable as the weights 233 of the leaf nodes 230, a subsequent generation of combinations of possible weights assignable as the weights 233 of the leaf nodes 230 may be repeatedly generated, for example, by the weighted-search-tree generation module 120, by performing the genetic algorithms of the inheritance and at least one of the crossover and the mutation in a previous generation of combinations of possible weights assignable as the weights 233 of the leaf nodes 230 until a fitness threshold is met by the lastly obtained generation of combinations of possible weights. In assigning the weights 233 of the leaf nodes 230, a fitness evaluation of each of the combinations of possible weights assignable as the weights 233 of the leaf node 230 in the first generation may be performed.

In determining whether a document is in a document class, a relevance score for the document may be calculated as a function of an occurrence in the document of the plurality of terms, the operators of the common nodes 220, and the weights 233 of the leaf nodes 230 and comparing the relevance score to a relevance score threshold set for the document class. In determining whether a document is in a document class, whether at least one of the plurality of terms 231 occurs in a uniform resource locator of the document may be determined.

Figure 4:
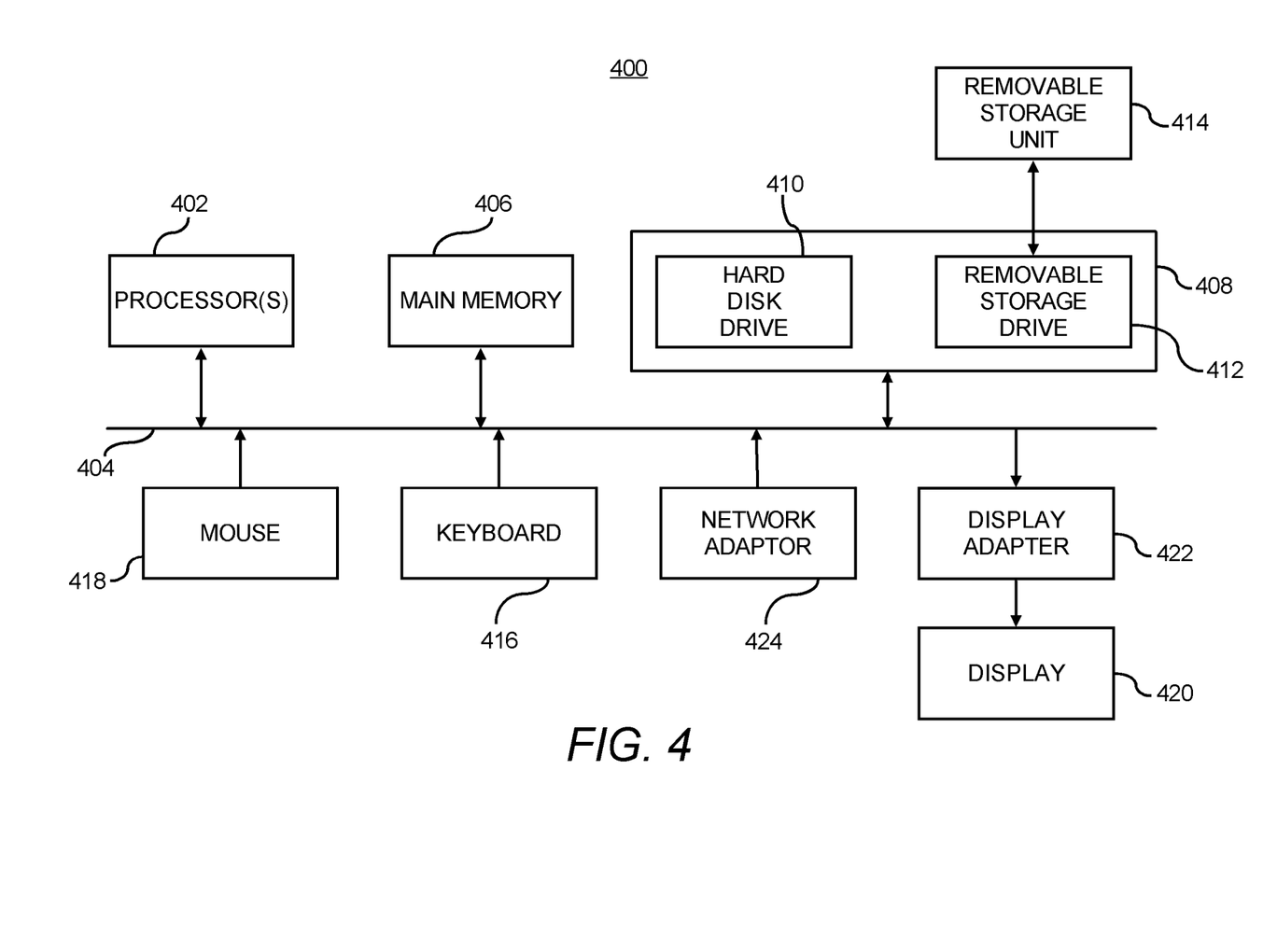
FIG. 4 shows a block diagram of a computing apparatus configured to implement or execute one or more modules of the classifier device depicted in FIG. 1, according to an embodiment of the invention.

Turning now to FIG. 4, there is shown a block diagram of a computing apparatus 400 configured to implement or execute any one, a combination, or all of the modules of the classifier device 100 depicted in FIG. 1, according to an example. In this respect, the computing apparatus 400 may be used as a platform for executing any one or more of the functions described hereinabove with respect to any one or more of the modules of the classifier device 100.

The computing apparatus 400 includes a processor 402 that may implement or execute some or all of the steps described in the method 300. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the method 300 may be stored.

The removable storage drive 412 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. It should also be apparent that one or more of the components depicted in FIG. 4 may be optional (for instance, user input devices, secondary memory, etc.).

By using genetic algorithms to improve weights of the weighted search tree 200, the weighted search tree 200 provides a simple, intuitive, and flexible way of classifying documents.

Any one or all of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A device for classifying a document, the device comprising:
   a processor; and
   a memory having machine-readable instructions that are to cause the processor to:
   generate a data tree structure;
   assign a plurality of terms to a plurality of first nodes of the data tree structure, wherein each of the plurality of first nodes is assigned a weight, the data tree structure comprising at least one common node, and each of the at least one common node is connected to at least two of the plurality of first nodes and is assigned an operator;
   obtain a first generation of combinations of possible weights assignable as the weights of the plurality of first nodes, wherein the combinations of possible weights in the first generation correspond to chromosomes in genetic algorithms and the possible weights of each combination correspond to genes of the respective chromosomes;
   obtain a second generation of combinations of possible weights assignable as the weights of the plurality of first nodes through performance of the genetic algorithms of an inheritance and at least one of a crossover and a mutation in the first generation of combinations of possible weights;
   assign the weights of the plurality of first nodes in response to at least the second generation of combinations of possible weights;
   receive the document;
   determine whether the document is in a document class based on a calculation of a relevance score for the document as a function of an occurrence in the document of the plurality of terms, the operator of the at least one common node, and the weights assigned to the plurality of first nodes; and
   output the determination.

2. The device of claim 1, wherein to determine whether the document is in a document class, the machine-readable instructions are to further cause the processor to
   compare the relevance score to a relevance score threshold set for the document class and determine whether the document is in the document class based on the comparison.

3. The device of claim 1,
   wherein the at least one common node comprises a plurality of common nodes and a root node, the plurality of common nodes being commonly connected to the root node, and each of the plurality of common nodes being assigned a multiplication factor, and
   wherein to calculate the relevance score of the document, the machine-readable instructions are further to cause the processor to multiply an output of each of the plurality of common nodes by the multiplication factor assigned to each common node, and to supply the multiplied products as inputs to the root node.

4. The device of claim 1, wherein the operator of the at least one common node performs one of selecting a maximum among inputs to the at least one common node, and selecting a minimum among inputs to the at least one common node.

5. A method for classifying a document, the method comprising:
   assigning, by a processor, a plurality of terms to a plurality of first nodes of a data tree structure, wherein each of the plurality of first nodes is assigned a weight, the data tree structure comprising at least one common node, and each of the at least one common node is connected to at least two of the plurality of first nodes and is assigned an operator;
   obtaining, by the processor, a first generation of combinations of possible weights assignable as the weights of the plurality of first nodes, wherein the combinations of possible weights in the first generation correspond to chromosomes in genetic algorithms and the possible weights of each combination correspond to genes of the respective chromosomes;
   obtaining, by the processor, a second generation of combinations of possible weights assignable as the weights of the plurality of first nodes by performing the genetic algorithms of an inheritance and at least one of a crossover and a mutation in the first generation of combinations of possible weights;
   assigning, by the processor, the weights of the plurality of first nodes in response to at least the second generation of combinations of possible weights; and
   determining, by the processor, whether the document is in a document class based on a calculation of a relevance score for the document as a function of an occurrence in the document of the plurality of terms, the operator of the at least one common node, and the weights of the plurality of first nodes.

6. The method of claim 5, wherein the inheritance comprises selected ones of the combinations of possible weights in the first generation inherited as selected ones of the combinations of possible weights in the second generation without any change.

7. The method of claim 5, wherein the crossover comprises crossing over selected weights from at least two of the combinations of possible weights in the first generation and the mutation comprises mutating selected weights of at least one of the combinations of possible weights in the first generation.

8. The method of claim 5,
   wherein the operator of the at least one common node performs one of selecting a maximum among inputs to the at least one common node, and selecting a minimum among inputs to the at least one common node, and
   wherein for each of the plurality of first nodes assigned a term of the plurality of terms, assigning a location where each term is to appear in the document in order to be included in the calculation of the relevance score involving each of the plurality of first nodes.

9. The method of claim 5, wherein the at least one common node comprises a plurality of common nodes and a root node comprising an assigned operator, and the plurality of common nodes are commonly connected to the root node.

10. The method of claim 9, wherein each of the plurality of common nodes is assigned a respective multiplication factor and determining whether the document is in a document class comprises multiplying an output of each of the plurality of common nodes by the respective multiplication factor of each common node, and supplying the multiplied products as inputs to the root node, wherein the multiplication factors comprise a plurality of different multiplication factors.

11. The method of claim 5, further comprising repeatedly obtaining a subsequent generation of combinations of possible weights assignable as the weights of the plurality of first nodes by performing the genetic algorithms of the inheritance and at least one of the crossover and the mutation in a previous generation of combinations of possible weights assignable as the weights of the plurality of first nodes until a fitness threshold is met by the lastly obtained generation of combinations of possible weights.

12. The method of claim 5, wherein assigning the weights of the plurality of first nodes in response to at least the second generation of combinations of possible weights is performed in response to a fitness evaluation of each of the combinations of possible weights assignable as the weights of the plurality of first nodes in the first generation.

13. The method of claim 5, wherein determining whether a document is in a document class comprises calculating a relevance score for the document as a function of an occurrence in the document of the plurality of terms, the operator of the at least one common node, and the weights of the plurality of first nodes and comparing the relevance score to a relevance score threshold set for the document class.

14. The method of claim 5, wherein determining whether a document is in a document class comprises determining whether at least one of the plurality of terms occurs in a uniform resource locator of the document.

15. A non-transitory computer readable medium comprising machine readable instructions for classifying a document, the machine readable instructions, when executed by a processor, cause the processor to:
  assign a plurality of terms to a plurality of first nodes of a data tree structure, wherein each of the plurality of first nodes is assigned a weight, the data tree structure comprises at least one common node, and each of the at least one common node is connected to at least two of the plurality of first nodes and is assigned an operator;
  obtain a first generation of combinations of possible weights assignable as the weights of the plurality of first nodes, wherein the combinations of possible weights in the first generation correspond to chromosomes in genetic algorithms and the possible weights of each combination correspond to genes of the respective chromosomes;
  obtain a second generation of combinations of possible weights assignable as the weights of the plurality of first nodes by performing the genetic algorithms of an inheritance and at least one of a crossover and a mutation in the first generation of combinations of possible weights;
  assign the weights of the plurality of first nodes in response to at least the second generation of combinations of possible weights; and
  determine whether the document is in a document class in response to an occurrence in the document of the plurality of terms, the operator of the at least one common node, and the weights of the plurality of first nodes.

16. The device of claim 1, wherein for each of the plurality of first nodes assigned a term of the plurality of terms, the machine readable instructions are to cause the processor to assign a location where each term is to appear in the document in order to be included in the calculation of the relevance score involving each of the plurality of first nodes.

17. The method of claim 5, wherein for each of the plurality of first nodes assigned a term of the plurality of terms, assigning a location where each term is to appear in the document in order to be included in the calculation of the relevance score involving each of the plurality of first nodes.

18. The non-transitory computer readable medium of claim 15, wherein for each of the plurality of first nodes assigned a term of the plurality of terms, the machine readable instructions are to cause the processor to assign a location where each term is to appear in the document in order to be included in the calculation of the relevance score involving each first node.

\* \* \* \* \*